UNITED STATES PATENT OFFICE.

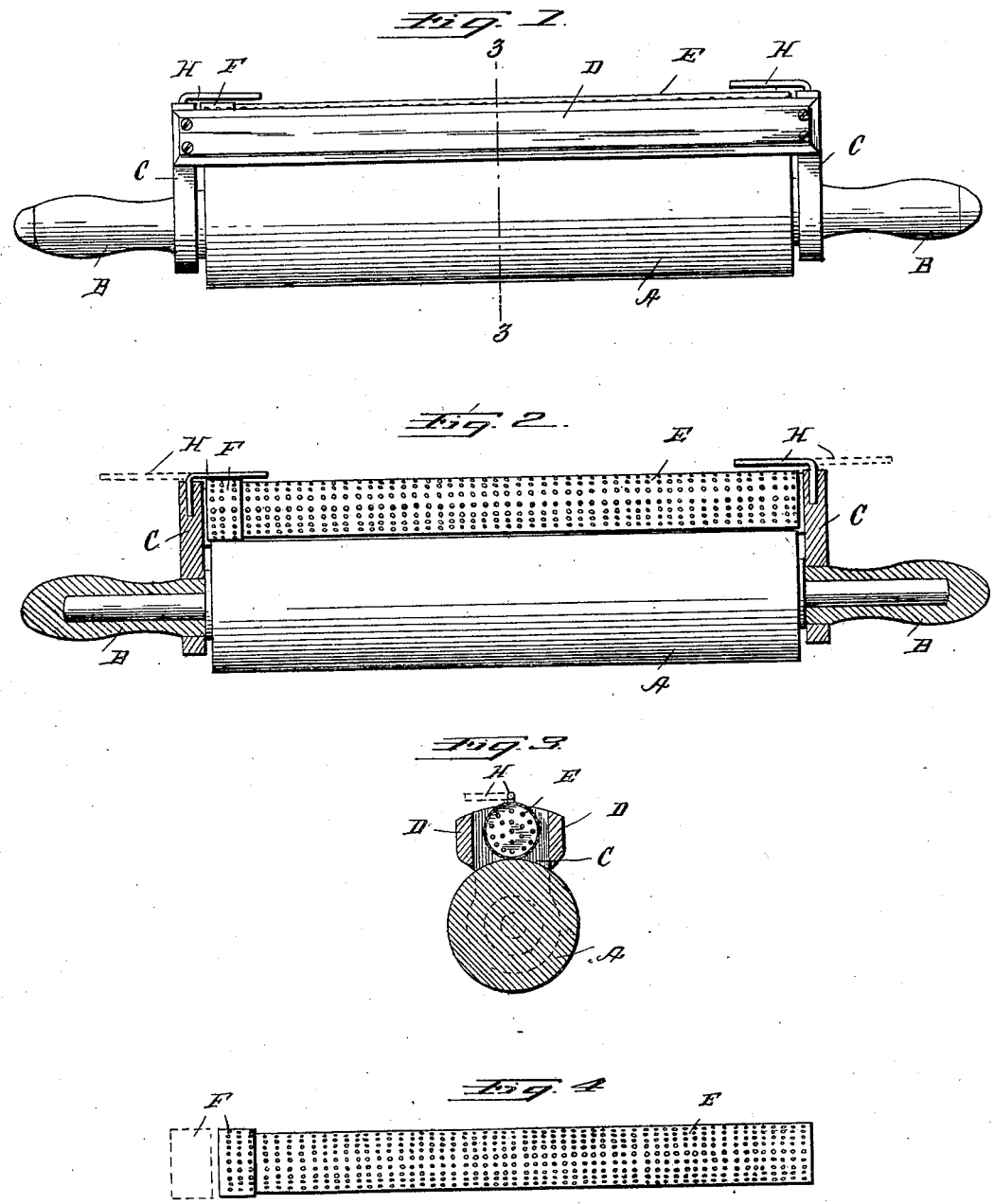

MORTON HARLOE, OF HAWLEY, PENNSYLVANIA.

ROLLING-PIN.

No. 807,075. Specification of Letters Patent. Patented Dec. 12, 1905.

Application filed August 25, 1905. Serial No. 275,769.

*To all whom it may concern:*

Be it known that I, MORTON HARLOE, a citizen of the United States, residing at Hawley, in the county of Wayne and State of Pennsylvania, have invented certain new and useful Improvements in Rolling-Pins, of which the following is a specification, reference being had therein to the accompanying drawings.

This invention relates to rolling-pins for culinary use.

The object of the invention is to produce a rolling-pin which shall carry a trough and a dredger for flour or sugar by which the dough may be more or less covered while it is under manipulation on the molding-board, thus preventing sticking to the dough.

The invention consists in the construction and combination of elements substantially as hereinafter described and claimed.

Figure 1 is a side elevation of the rolling-pin, showing trough thereon. Fig. 2 is a vertical central section thereof, showing roller and dredger in elevation. Fig. 3 is a cross-section on line 3 3, Fig. 1. Fig. 4 is a plan of the dredger detached.

The rolling-pin A is of any suitable or usual construction. The handles B are preferably detachable, and the roll A turns on the handles B B.

The trough ends C are attached to handles B and extend above the top of the roll. To the sides of these pieces B the side pieces D of the trough are attached, and these trough sides D extend so close to the roller A that the latter can barely turn without contact with these trough sides. Thus the rolling-pin or roller A is surmounted by a trough which is open at the bottom save as the roller itself forms a bottom to said trough. As the trough is secured to the handles B, it may be held in inclined position instead of being directly over the roller A by the hand-grasps on the handles.

I make a hollow cylinder E, preferably of perforated sheet metal, which cylinder or dredger is a little shorter than the trough and of such diameter as to have some play in the trough. The dredger has a cover F, so that it may be filled with flour or sugar, as may be required or desired. When placed in the trough, the dredger is held against escape by hooks H, which hooks may be swung aside to permit the insertion and removal of the dredger.

When the dredger is partly full of flour and is placed on top of the roller A and within the trough, the roller can be so manipulated as to sprinkle more or less of the flour onto the roller, whence it will be carried onto the dough.

As the roller revolves it causes the dredger to revolve with it, so that the contents of the dredger are tumbled, as in a tumbling-box. The cylindrical dredger will be rotated in opposite directions as the roller moves forward or back and can be brought against either side of the trough by moving the roll in opposite directions, as usual in rolling dough. A little experience gives great facility in the use of the rolling-pin, so that the dredger may be made to drop just as much flour (or fine sugar, as in rolling out cookies) as is needed in the rolling.

The trough itself may be made to contain flour or sugar, which will be carried down by the roll; but unless there be a dredger in the trough the delivery is generally too rapid.

What I claim is—

1. A rolling-pin and a trough suspended above the same, and a cylindrical dredger in said trough, in combination.

2. A rolling-pin, pivoted handles on said pin, a trough rigid with the handles, and a rotating dredger in said trough, all combined.

3. A rolling-pin having a trough suspended above the same, a dredger in said trough, and means for retaining the dredger in the trough, all combined.

In testimony whereof I affix my signature in presence of two witnesses.

MORTON HARLOE.

Witnesses:
   A. S. HARLOE,
   F. H. PHILLIPS.